United States Patent
Nabeto et al.

(10) Patent No.: US 12,275,132 B2
(45) Date of Patent: Apr. 15, 2025

(54) TACTILE SENSOR, ROBOT HAND, AND ROBOT

(71) Applicant: OMRON Corporation, Kyoto (JP)

(72) Inventors: Misato Nabeto, Kyoto (JP); Sayaka Doi, Joyo (JP); Hiroki Koga, Nara (JP)

(73) Assignee: OMRON Corporation, Kyoto (JP)

( * ) Notice: Subject to any disclaimer, the term of this patent is extended or adjusted under 35 U.S.C. 154(b) by 419 days.

(21) Appl. No.: 17/616,587

(22) PCT Filed: Jun. 6, 2019

(86) PCT No.: PCT/JP2019/022638
§ 371 (c)(1),
(2) Date: Dec. 3, 2021

(87) PCT Pub. No.: WO2020/246007
PCT Pub. Date: Dec. 10, 2020

(65) Prior Publication Data
US 2022/0250253 A1    Aug. 11, 2022

(51) Int. Cl.
*B25J 13/08* (2006.01)

(52) U.S. Cl.
CPC .................... *B25J 13/084* (2013.01)

(58) Field of Classification Search
CPC .............. B25J 19/02–028; G01L 5/226–228
See application file for complete search history.

(56) References Cited

U.S. PATENT DOCUMENTS

| 8,336,399 B2 | 12/2012 | Muroyama et al. |
| 2011/0067504 A1 | 3/2011 | Koyama et al. |
| 2019/0064013 A1 | 2/2019 | Kandori |
| 2019/0248020 A1 | 8/2019 | Yoon et al. |
| 2020/0171677 A1 | 6/2020 | Endo |

FOREIGN PATENT DOCUMENTS

| EP | 2602069 A1 * | 6/2013 | ............. A61B 34/30 |
| JP | S57205092 A * | 12/1982 | |
| JP | S63-277945 A | 11/1988 | |
| JP | H109-257612 A | 10/1997 | |
| JP | 2002-365122 A | 12/2002 | |
| JP | 2005-003494 A | 1/2005 | |
| JP | 2005-106487 A | 4/2005 | |
| JP | 2005-349492 A | 12/2005 | |

(Continued)

OTHER PUBLICATIONS

Machine translation of JP 2002-365122 A (Year: 2002).*

(Continued)

*Primary Examiner* — Judy Nguyen
*Assistant Examiner* — James Split
(74) *Attorney, Agent, or Firm* — Morgan, Lewis & Bockius LLP

(57) ABSTRACT

A tactile sensor, comprising: a cover provided so as to cover at least a portion of a base; a first force detection section configured to detect a force acting on the cover in a direction toward the base from the cover; and a second force detection section configured to detect the force acting on the cover in a case in which the cover is further displaced in the direction toward the base after the first force detection section has detected the force acting on the cover.

18 Claims, 7 Drawing Sheets

(56) References Cited

FOREIGN PATENT DOCUMENTS

| JP | 2010-204014 | A  |   | 9/2010  |             |
|----|-------------|----|---|---------|-------------|
| JP |     5760485 | B2 |   | 8/2015  |             |
| JP | 2016-205942 | A  |   | 12/2016 |             |
| WO | 2009/144767 | A1 |   | 12/2009 |             |
| WO | WO-2010101174 | A1 | * | 9/2010 | ............. G01L 1/205 |
| WO | 2016/170848 | A1 |   | 10/2016 |             |
| WO | 2018/079771 | A1 |   | 5/2018  |             |
| WO | 2019/031502 | A1 |   | 2/2019  |             |

OTHER PUBLICATIONS

Machine translation of JP 2005-349492 A (Year: 2005).*
International Search Report issued in corresponding International Patent Application No. PCT/JP2019/022638 dated Sep. 3, 2021.
Written Opinion issued in corresponding International Patent Application No. PCT/JP2019/022638 dated Sep. 3, 2021.
Office Action issued in corresponding Japanese Patent Application No. 2021-524623 dated Jan. 24, 2023.
Extended European Search Report issued in corresponding European Patent Application No. 19932126.6 dated Dec. 6, 2022.
Office Action dated Jan. 9, 2024, issued in corresponding Japanese Patent Application No. 2021-524623.

* cited by examiner

TACTILE SENSOR, ROBOT HAND, AND ROBOT

TECHNICAL FIELD

The present disclosure relates to a tactile sensor, a robotic hand, and a robot.

BACKGROUND ART

Various technology relating to a tactile sensor provided to a robotic hand has been proposed with respect to cases in which an object such as a workpiece is gripped by the robotic hand, and the object is then transported or assembled to another object that is an assembly target.

For example, technology has been proposed in which electrostatic capacitance pressure sensors collectively serving as a 6-axis force sensor are disposed and fixed at twelve locations on an outer face of an internal support body so as to enable detection of pressing force from above, below, left, right, front, and rear (Japanese Patent Application Laid-Open (JP-A) No. 2016-205942).

SUMMARY OF INVENTION

Technical Problem

The technology disclosed in JP-A No. 2016-205942 is only configured from the same type of pressure sensor, and so is problematic in the respect that a range in which force (load) can be detected is thereby constricted. However, attempting to widen the range in which force can be detected using the same type of sensor would lead to a drop in sensitivity.

In consideration of the above points, an object of the present disclosure is to provide a tactile sensor, a robotic hand, and a robot that are capable of detecting a small force with a high sensitivity and are also capable of widening a range in which force can detected compared to cases in which force is detected by the same type of force detection section.

Solution to Problem

In order to achieve the above object, a tactile sensor according to the present disclosure includes a cover provided so as to cover at least a portion of a base, a first force detection section configured to detect a force acting on the cover in a direction toward the base from the cover, and a second force detection section configured to detect the force acting on the cover in a case in which the cover is further displaced in the direction toward the base after the first force detection section has detected the force acting on the cover.

Advantageous Effects of Invention

The tactile sensor, the robotic hand, and the robot according to the present disclosure include the first force detection section configured to detect force acting on the cover and the second force detection section configured to detect force acting on the cover in cases in which the cover is further displaced in a direction toward the base after the first force detection section has detected force acting on the cover. This enables a small force to be detected with a high sensitivity and the range in which force can be detected to be widened compared to cases in which forces are detected by the same type of force detection section.

DESCRIPTION OF EMBODIMENTS

Figure 1:
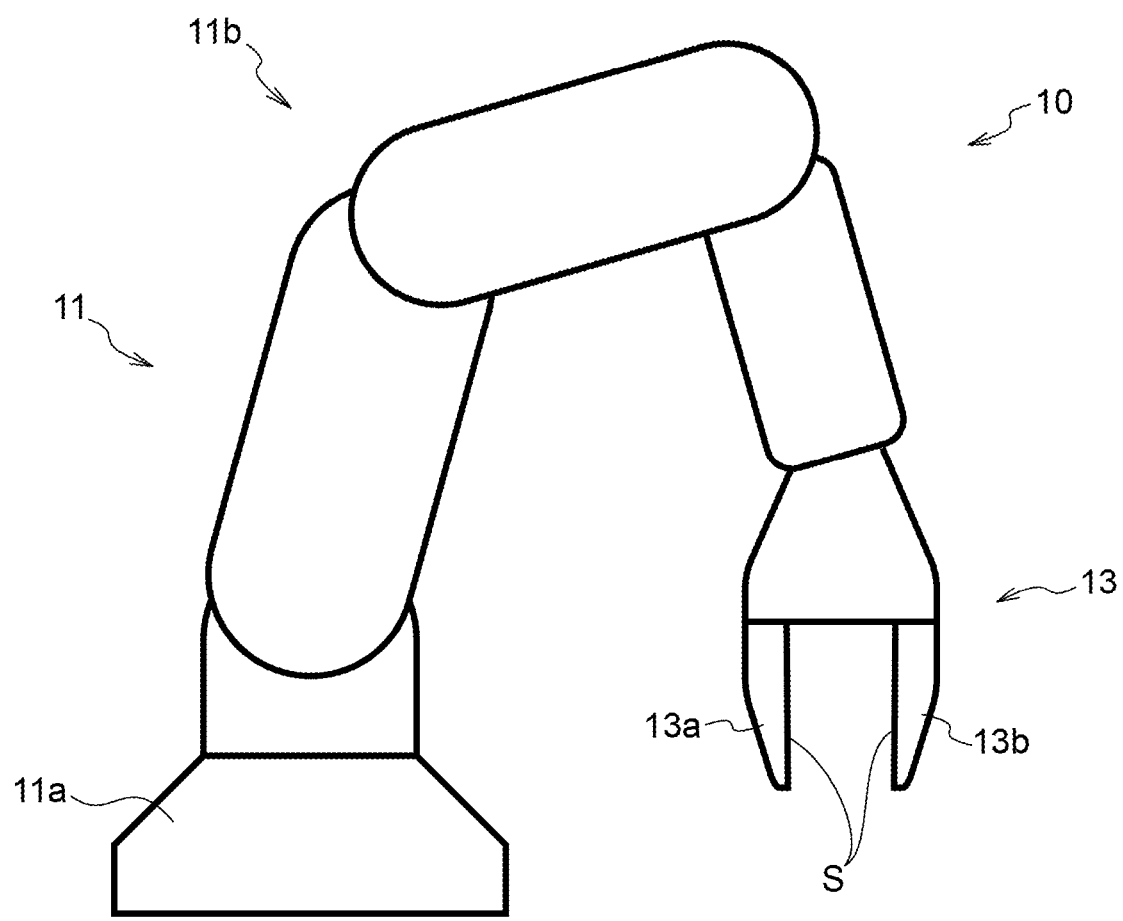
FIG. 1 is a schematic view illustrating an example of a configuration of a robot according to a first exemplary embodiment of the present disclosure.

Explanation follows regarding examples of exemplary embodiments of the present disclosure, with reference to the drawings. Note that in the respective drawings, the same or equivalent configuration elements and sections are allocated the same reference numerals. Moreover, the dimensional proportions in the drawings may be exaggerated to aid explanation, and may therefore differ from actual proportions.

First Exemplary Embodiment

Schematic Configuration of Robot

First, explanation follows regarding an example of a schematic configuration of a robot 10 according to an exemplary embodiment, with reference to FIG. 1. The robot 10 according to the present exemplary embodiment is for example an industrial robot that performs various operations while gripping a workpiece, serving as a target object. An example of an operation performed by the robot 10 is an operation to assemble a finished product or a semi-finished product. More specifically, examples include an operation to insert an electronic component with a fragile terminal at a predetermined position, and an operation to fit together components that requires a large pressing force. As illustrated in FIG. 1, the robot 10 includes a robot body 11 and a robotic hand 13.

The robot body 11 includes a support 11a, and a robotic arm 11b attached to one end side of the support 11a. The robotic hand 13 is provided at another end side of the robotic arm 11b. The robotic hand 13 includes fingers 13a, 13b, each serving as an opposing section with respect to a tactile sensor (corresponding to a tactile sensor 100 or 200 explained with reference to FIG. 2 onward), described later. The tactile sensors are provided to mutually opposing surfaces S of the fingers 13a, 13b. The fingers 13a, 13b serving as opposing sections of the robotic hand 13 are driven toward a target object, such that the target object is gripped between the respective opposing sections and the corresponding tactile sensors. The above explanation is an example of a configuration of the robot 10 according to the present exemplary embodiment.

Schematic Configuration of Tactile Sensor

Figure 2:
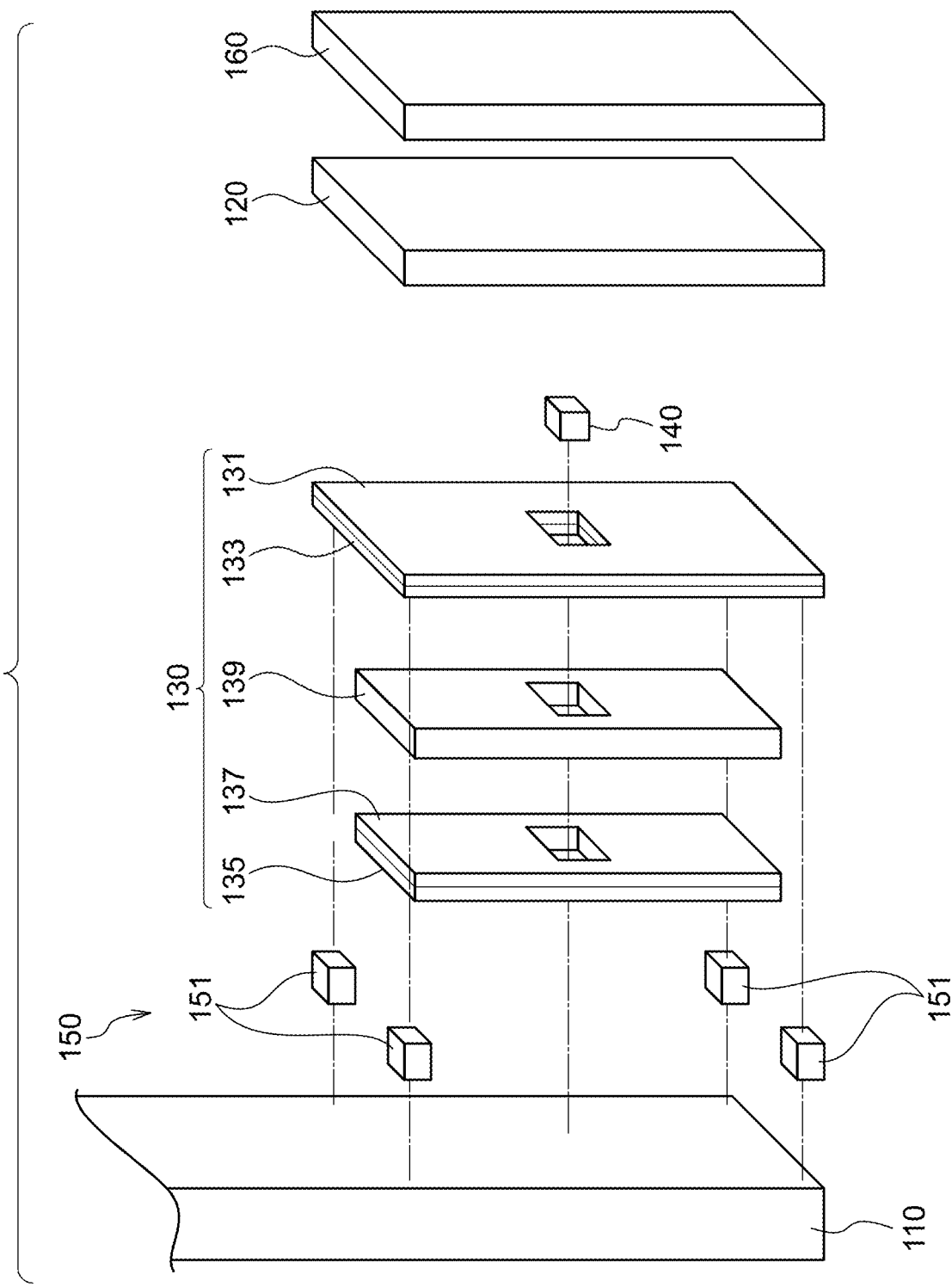
FIG. 2 is an exploded perspective view illustrating an example of a configuration of a tactile sensor according to the first exemplary embodiment.
Figure 3:
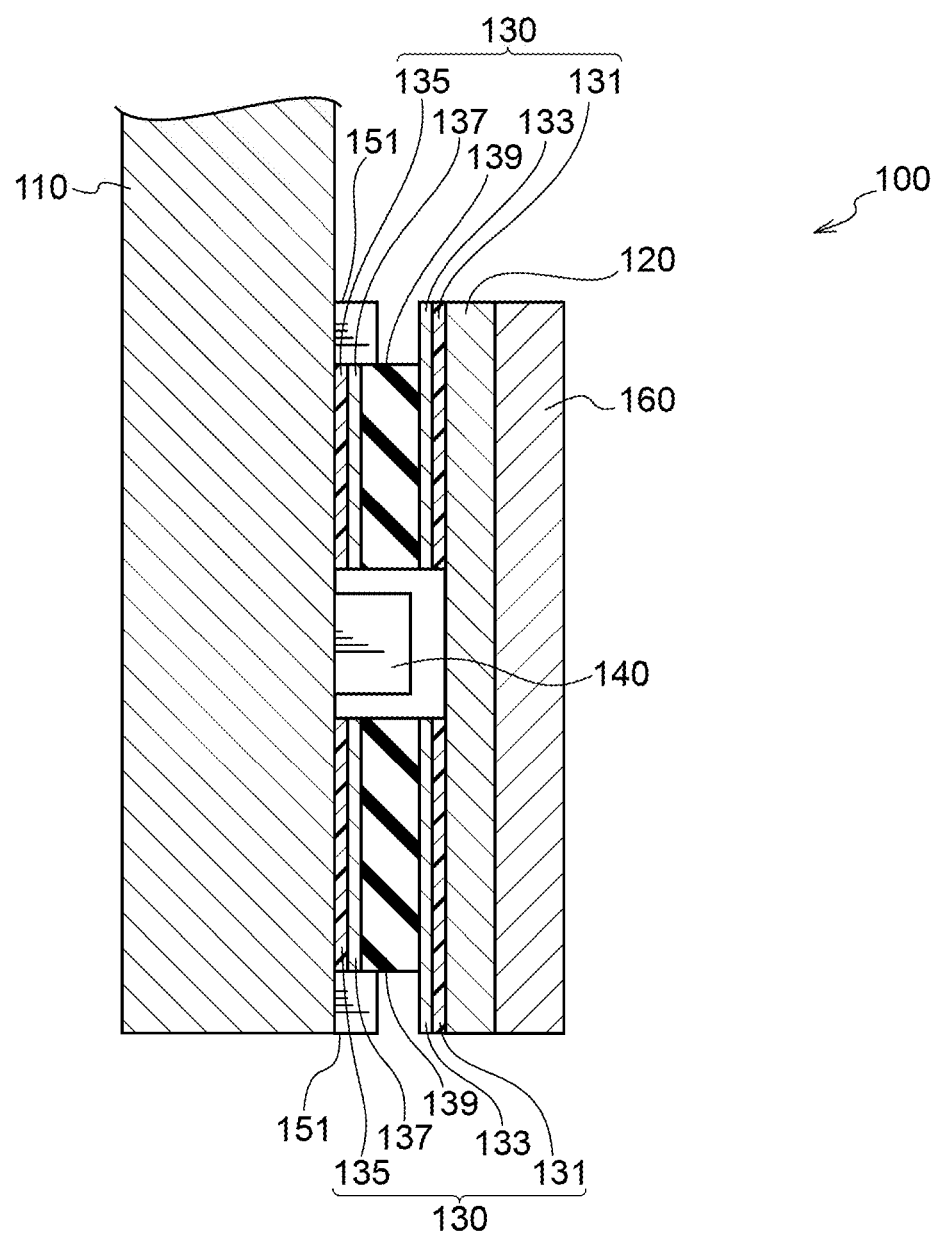
FIG. 3 is a cross-section illustrating an example of a configuration of a tactile sensor according to the first exemplary embodiment.
Figure 4:
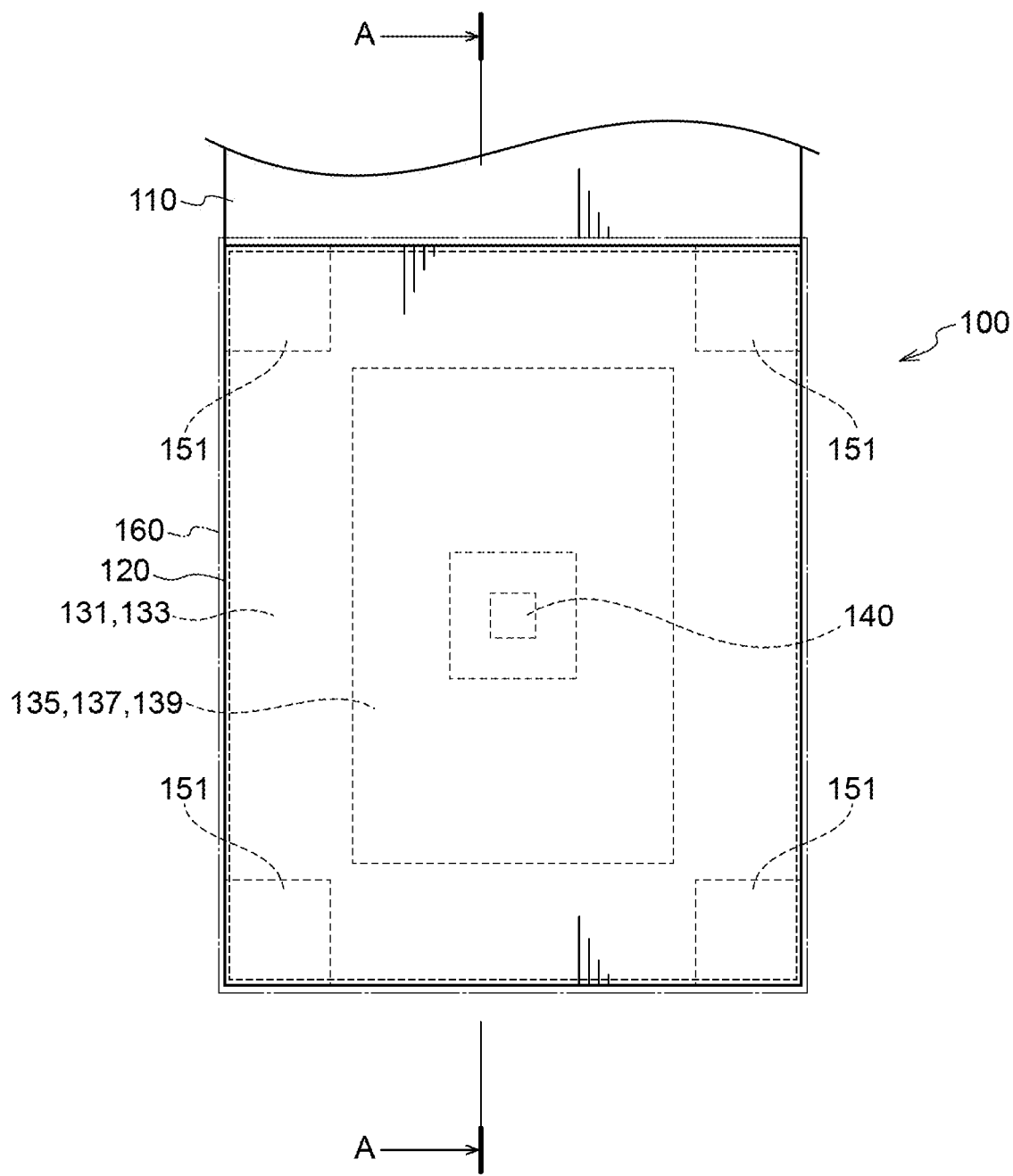
FIG. 4 is a plan view illustrating an example of a configuration of a tactile sensor according to the first exemplary embodiment.

Next, explanation follows regarding an example of a schematic configuration of a tactile sensor 100 according to the present exemplary embodiment, with reference to FIG. 2, FIG. 3, and FIG. 4. FIG. 3 is a cross-section view sectioned along A-A in FIG. 4. The tactile sensor 100 is a device for qualitatively or quantitatively detecting force (load) acting on a cover 120 in a direction toward a base 110. In cases in which the tactile sensor 100 is applied to the finger 13a of the robotic hand 13, the tactile sensor 100 detects force acting on the cover 120 from a target object that is being gripped between the tactile sensor 100 and the finger 13b serving as the opposing section thereto. As illustrated in FIG. 2, the tactile sensor 100 includes the cover 120, a first force detection section 130, and a second force detection section 140.

The base 110 is a plate shaped member that supports the tactile sensor 100. The base 110 may configure a portion of the fingers 13a, 13b of the robotic hand 13. There is no particular restriction to the material and shape of the base 110, as long as at least a portion of the base 110 can be covered by the cover 120, described below. For example, a metal or a hard resin may be employed as the material of the base 110.

The cover 120 is provided so as to cover at least part of the base 110. In particular, the cover 120 covers a range of the tactile sensor 100 required in order to detect force. In cases in which the tactile sensor 100 is employed in the robotic hand 13, the cover 120 covers a position corresponding to the finger 13a or 13b serving as the opposing section. As illustrated in FIG. 3, the cover 120 is provided at a position opposing the base 110. The cover 120 is retained so as to be capable of moving in a direction toward the base 110. There is no particular limitation to the material and shape of the cover 120, as long as the cover 120 has sufficient rigidity with respect to force acting thereon, as described later. For example, a metal or a hard resin may be employed as the material of the cover 120. Moreover, the shape of the cover 120 is not limited to a rectangular shape such as that described later, and may be any desired shape that is capable of covering at least a portion of the base 110.

The first force detection section 130 is provided between the cover 120 and the base 110, and detects force acting on the cover 120 in a direction toward the base 110 from the cover 120. The first force detection section 130 has a high detection sensitivity with respect to a relatively small force. The rating of load detected by the first force detection section 130 is a relatively small value. Specifically, the first force detection section 130 detects force in a range from approximately 0.5N to approximately 20N. In particular, the detection sensitivity of the first force detection section 130 is approximately 0.5N.

The first force detection section 130 has a configuration in which an elastic member is provided between a pair of substrates, and at least one of the substrates is provided with an electrode. The first force detection section 130 detects force acting on the cover 120 by detecting a change in electrical characteristics (such as a change in electrostatic capacitance or a change in a resistance value) between the pair of substrates, at least one of which is provided with an electrode, accompanying expansion or contraction of the elastic member. Note that an electrode may be provided to each substrate of the pair of substrates.

The first force detection section 130 is capable of detecting a relatively small force with a high sensitivity due to having the configuration in which the elastic member is provided between the pair of substrates, at least one of which is provided with an electrode. Namely, the first force detection section 130 has a configuration employing the elastic member that is capable of minute displacement, and so the first force detection section 130 is capable of detecting a small force with a high sensitivity. Moreover, due to having the configuration in which the elastic member is provided between the pair of substrates, at least one of which is provided with an electrode, the first force detection section 130 is able to detect force acting on the cover 120 over a wide region of the cover 120, such that the ease of design of the tactile sensor 100 is improved.

Specifically, as illustrated in FIG. 3, the first force detection section 130 may include an elastic member 139 between a first substrate 131 provided with a first electrode 133, and a second substrate 135 provided with a second electrode 137. The first force detection section 130 detects force acting on the cover 120 by detecting a change in electrostatic capacitance between the first electrode 133 and the second electrode 137 accompanying expansion or contraction of the elastic member 139.

The first electrode 133 and the second electrode 137 are metal electrodes that oppose each other on either side of the elastic member 139. The first substrate 131 is a resin substrate provided with the first electrode 133 on a face opposing the second substrate 135. The second substrate 135 is a resin substrate provided with the second electrode 137 on a face opposing the first substrate 131.

The elastic member 139 is a member having a predetermined elasticity such that the cover 120 displaces in a direction toward the base 110 when force acts on the cover 120. The elastic member 139 is provided between the first electrode 133 and the second electrode 137. The elastic member 139 is for example configured of a soft resin such as rubber. There is no particular limitation to the material and structure of the elastic member 139 as long as the elastic member 139 has a predetermined elasticity and is capable of changing a distance between the first electrode 133 and the second electrode 137 in response to force acting on the cover 120. For example, the elastic member 139 may be configured of a leaf spring or a coil spring made of a resin or a metal. The elastic member 139 may be directly attached to the cover 120 and the base 110 so as to be capable of contacting and separating from the first electrode 133 and the second electrode 137. Instead of the elastic member 139 being provided between the electrodes, the first force detection section 130 according to the present exemplary embodiment may have a configuration in which the elastic member 139 is provided outside the electrodes, and is supported so as to be capable of contacting and separating from the first electrode 133 and the second electrode 137.

As illustrated in FIG. 4, the first substrate 131 provided with the first electrode 133 is provided across substantially the entire face on the base 110-side of the cover 120. On the other hand, the elastic member 139 and the second substrate 135 provided with the second electrode 137 are provided at a central portion between the base 110 and the cover 120 when the cover 120 is viewed in plan view. Namely, a region where the elastic member 139 and the second substrate 135 provided with the second electrode 137 are not provided is present at an outer peripheral side between the base 110 and the cover 120 when the cover 120 is viewed in plan view. In this manner, the first force detection section 130 is provided in a region with a predetermined width between the cover 120 and the base 110. This enables force acting on the cover 120 to be detected over a wide region of the cover 120.

As illustrated in FIG. 2, a rectangular space may be provided in the first force detection section 130 at substantially the center of the elastic member 139 and of the pair of substrates provided with the electrodes. The second force detection section 140, described below, is housed inside this space.

The second force detection section 140 detects force acting on the cover 120 in cases in which the cover 120 is further displaced in a direction toward the base 110 after the first force detection section 130 has detected force acting on the cover 120. The second force detection section 140 is capable of detecting up to a relatively large force (namely load) over a wide range. Namely, a rating of load detected by the second force detection section 140 is a relatively high value.

In particular, a maximum value of force that the second force detection section 140 is capable of detecting is larger than a maximum value of force that the first force detection section 130 is capable of detecting. Specifically, the second force detection section 140 is capable of detecting force in a range from approximately 1.5N to approximately 50N. The detection sensitivity of the second force detection section 140 is approximately 1.5N.

Since the maximum value of force that the second force detection section 140 is capable of detecting is larger than the maximum value of force that the first force detection section 130 is capable of detecting, a range in which force can be detected can be widened compared to cases in which force is only detected by the first force detection section 130. Furthermore, the second force detection section 140 detects force acting on the cover 120 in cases in which the cover 120 is further displaced in a direction toward the base 110 after the first force detection section 130 has detected force. Thus, a small force is detected with a high sensitivity by the first force detection section 130, and force is then detected by the second force detection section 140 in a range in with the first force detection section 130 has a low detection precision or cannot detect the force. Thus, the tactile sensor 100 according to the present exemplary embodiment enables a small force to be detected with a high sensitivity, and also enables the range in which force can be detected to be widened.

The second force detection section 140 may be a single axial direction force sensor that detects force in a direction from the cover 120 toward the base 110. Employing a force sensor capable of detecting up to a relatively large force enables force to be detected over a wider range than in cases in which only the first force detection section 130 is provided. The second force detection section 140 may for example be a piezoresistive force sensor.

The force sensor serving as the second force detection section 140 has a structure with a higher rigidity (namely, is less likely to be displaced) than the first force detection section 130 with the configuration including the elastic member 139. Namely, the second force detection section 140 is capable of detecting a relatively large force with a small stroke. This suppresses the first force detection section 130 from deforming excessively under a large stroke due to a relatively large force being detected by the second force detection section 140. Moreover, the output from the second force detection section 140 with respect to a relatively large force acting on the cover 120 is a linear response, thereby facilitating control employing output from the tactile sensor 100. In particular, in cases in which the first force detection section 130 is configured including the elastic member 139, output from the first force detection section 130 with respect to a relatively large force is non-linear. Thus, utilizing the linear response from the second force detection section 140 in cases in which a relatively large force is detected further facilitates control.

As illustrated in FIG. 3 and FIG. 4, the second force detection section 140 is disposed inside the rectangular space provided at the substantially central portion of the first force detection section 130. The second force detection section 140 is attached to the base 110 inside this space. The second force detection section 140 is configured so as not to contact the face on the base 110-side of the cover 120 in a state in which force is not acting on the cover 120, and in a state in which displacement of the cover 120 in a direction toward the base 110 is small.

In cases in which force is acting on the cover 120 and the cover 120 is displaced in a direction toward the base 110 by a predetermined distance or greater, the cover 120 and the single axial direction force sensor serving as the second force detection section 140 contact one another. The force acting on the cover 120 is detected by the second force detection section 140 as a result. A protrusion that projects toward the single axial direction force sensor serving as the second force detection section 140 may be provided to the cover 120 at a position corresponding to the force sensor in order to facilitate detection of force acting on the cover 120.

Moreover, the second force detection section 140 may include plural force sensors in order to realize the force detection range described previously. In such cases, the second force detection section 140 does not have to be provided at the substantially central portion of the first force detection section 130. Namely, the plural force sensors serving as the second force detection section 140 may be provided at discrete positions between the cover 120 and the base 110.

The tactile sensor 100 according to the present exemplary embodiment may also include a restricting structure 150. The restricting structure 150 restricts tilting of the cover 120 with respect to the base 110. Restricting tilting of the cover 120 with respect to the base 110 using the restricting structure 150 enables disproportionate detection of force at a specific location to be prevented. As a result, force occurring in the cover 120 is precisely detected by the first force detection section 130 or the second force detection section 140 of the tactile sensor 100, enabling the range in which force can be detected by the tactile sensor 100 to be widened.

Specifically, the restricting structure 150 may be configured of stoppers 151 that restrict movement of the cover 120 in a direction toward the base 110. The stoppers 151 are substantially rectangular block shaped members that are fixed to the base 110.

End faces on the opposite side of the stoppers 151 to the base 110 are capable of directly or indirectly abutting the face on the base 110-side of the cover 120. As illustrated in FIG. 3, in a state in which force is not acting on the cover 120, a gap of a predetermined distance is provided between the end faces on the opposite side of the stoppers 151 to the base 110 and the face on the base 110-side of the cover 120. The cover 120 is displaced in a direction toward the base when force acts on the cover 120. When this occurs, in cases in which force only concentrates at a portion of the cover 120 such that that the cover 120 is displaced at a tilt with respect to the base 110, the stoppers 151 support the cover 120 such that this tilting of the cover 120 is suppressed.

As illustrated in FIG. 4, the stoppers 151 are provided at positions corresponding to peripheral edges of the cover 120. This restricts the peripheral edges of the cover 120 from moving in a direction toward the base 110, such that tilting of the cover 120 is suppressed. Moreover, the stoppers 151 are provided at positions corresponding to the four corners of the rectangular cover 120. This restricts the four corners of the cover 120 from moving in a direction toward the base 110, such that tilting of the cover 120 is suppressed. As a result, force occurring in the cover 120 is precisely detected by the first force detection section 130 or the second force detection section 140 of the tactile sensor 100, enabling the range in which force can be detected by the tactile sensor 100 to be widened.

There is no particular limitation to the material and shape of the stoppers 151, as long as the stoppers 151 have a predetermined rigidity so as to be capable of supporting the cover 120. In particular, the rigidity of the stoppers 151 should be no less than the rigidity of the elastic member 139. For example, a metal or a hard resin may be employed as the material of the stoppers 151.

The tactile sensor 100 according to the present exemplary embodiment may also include a contact section 160. The contact section 160 is provided to a face on the opposite side of the cover 120 to the base 110, and contacts a target location. The contact section 160 can be exchanged for another contact section 160 by being removed from the cover. There is no particular limitation to the shape and material of the contact section 160.

Direct contact between the target location and the cover is avoided as a result of including the contact section 160, such that the target location and the cover are protected. Moreover, configuring the contact section 160 as exchangeable enables the contact section 160 to be replaced when worn. This suppresses a biased distribution of force from acting on the cover 120 due to the contact section 160 deteriorating and becoming misshapen. Thus, force acting on the cover 120 is precisely detected by the first force detection section 130 or the second force detection section 140, enabling the range in which force can be detected by the tactile sensor 100 to be widened. Moreover, in cases in which the contact section 160 has deteriorated, it is sufficient to exchange the contact section 160 alone, such that the ease of maintenance is improved.

Moreover, by configuring the contact section 160 as exchangeable, in cases in which the tactile sensor 100 is employed in the robotic hand 13, a contact section 160 with suitable characteristics or shape can be employed depending on the type of workpiece or the content of the operation to be performed by the robotic hand 13. For example, in cases in which the workpiece is smooth and slips easily, a contact section 160 configured from a material with a high friction coefficient may be employed. Alternatively, in cases in which the workpiece has an outer profile including a spherical surface, a contact section 160 with a profile including a spherical surface corresponding to the workpiece may be employed. The ease of manipulation using the robotic hand 13 is improved as a result. An example of a schematic configuration of the tactile sensor 100 according to the present exemplary embodiment has been explained above.

Examples of Tactile Sensor Operation

Figure 5:
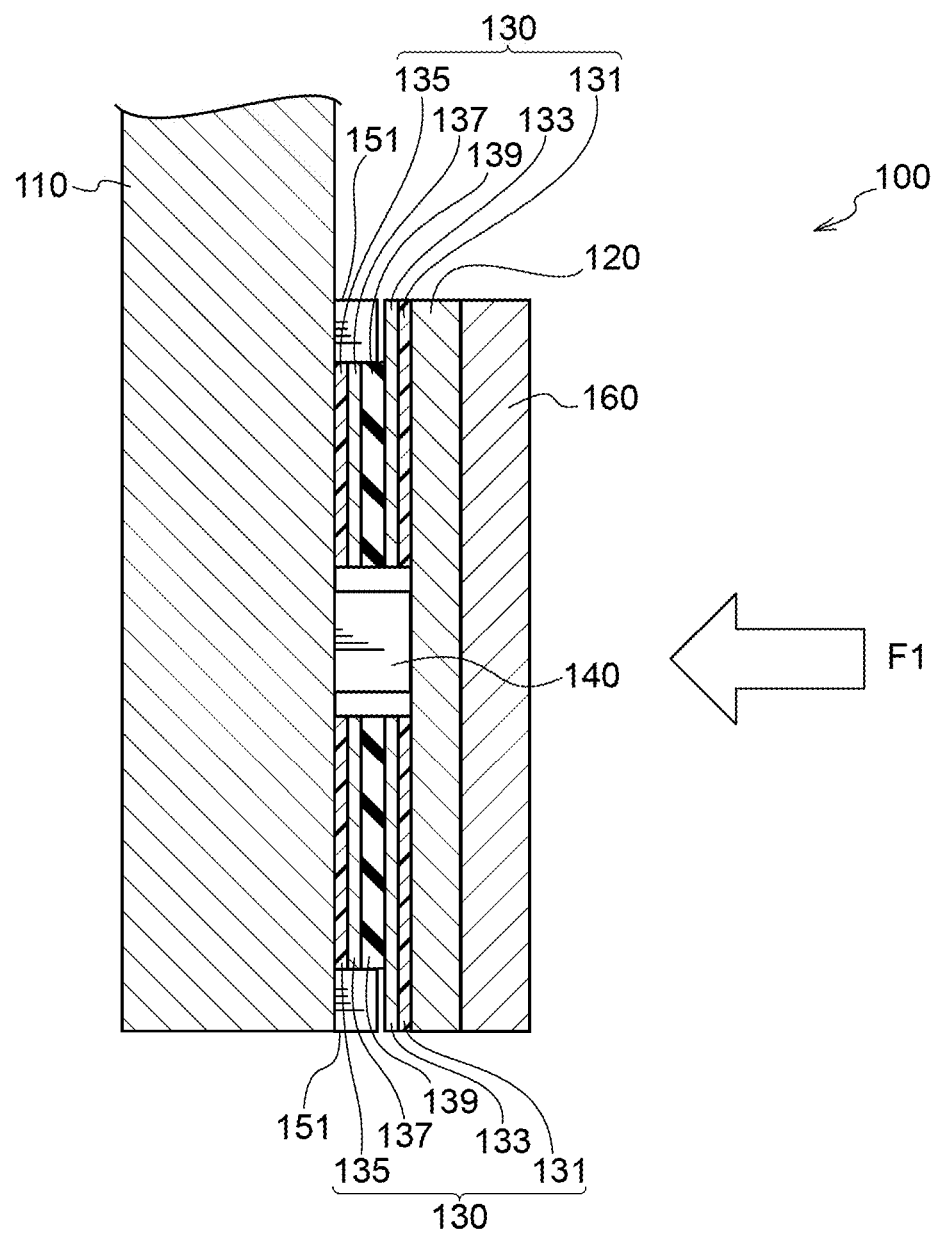
FIG. 5 is a cross-section illustrating an example of a scenario when force has been applied to a tactile sensor according to the first exemplary embodiment.
Figure 6:
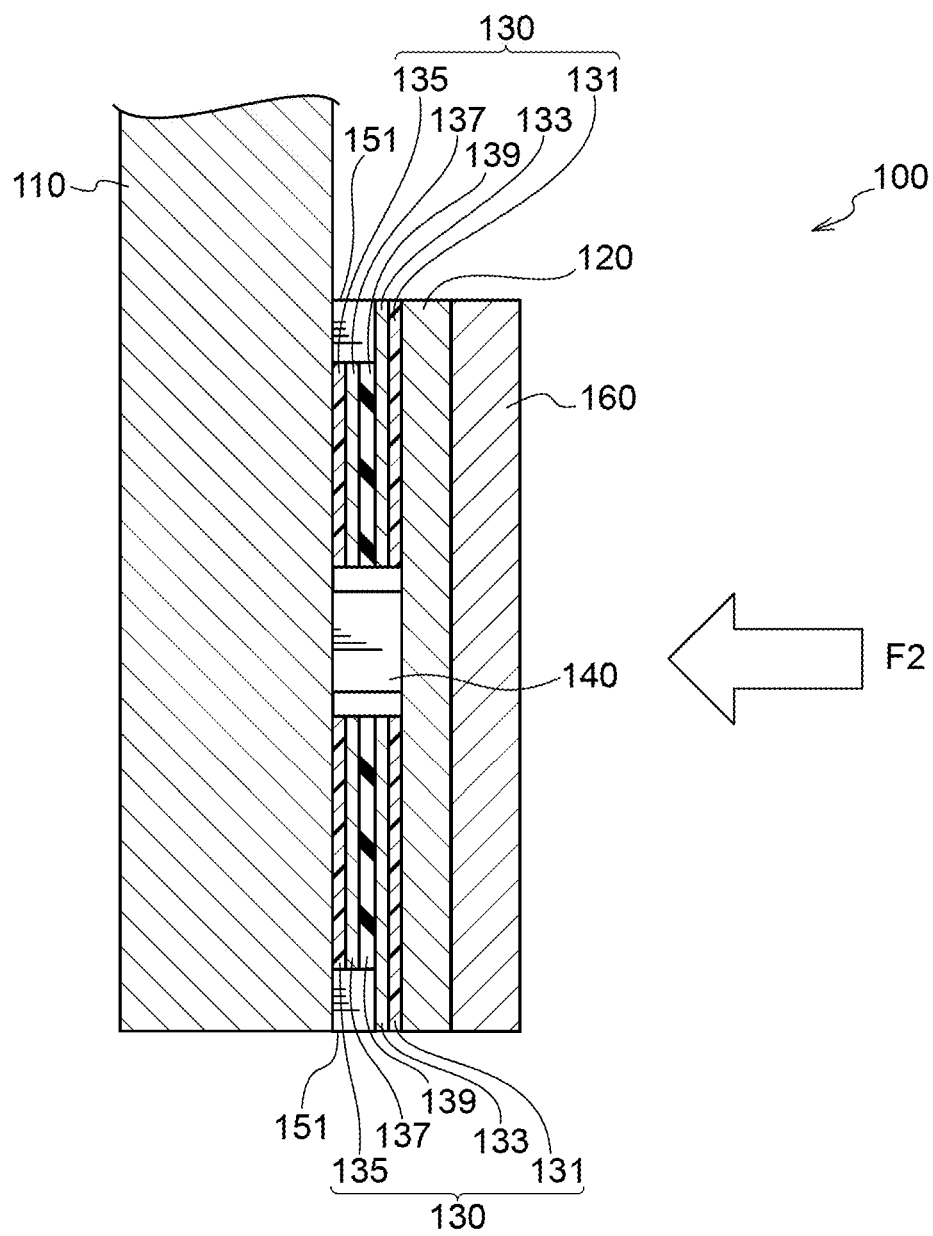
FIG. 6 is a cross-section illustrating an example of a scenario when force has acted on a tactile sensor according to the first exemplary embodiment.

Next, explanation follows regarding examples of operation of the tactile sensor 100 according to the present exemplary embodiment, with reference to FIG. 5 and FIG. 6. As an example, a relatively small force F1 may act on the cover 120 as illustrated in FIG. 5. When this occurs, the elastic member 139 undergoes compression deformation in the direction of the force F1 in response to the magnitude of the force F1. The distance between the first electrode 133 and the second electrode 137 changes, and the electrical characteristics of the elastic member 139, such as electrostatic capacitance, change as a result. The first force detection section 130 detects the force F1 with a high sensitivity based on this change in electrical characteristics. When this occurs, since the force F1 is relatively small, a compression amount of the elastic member 139 (namely, a displacement amount of the cover 120 toward the base 110) is small, and the force is either not detected or barely detected by the second force detection section 140. The tactile sensor 100 performs output relating to the detected force F 1.

As another example, a relatively large force F2 may act on the cover 120 as illustrated in FIG. 6. When this occurs, first, the elastic member 139 of the first force detection section 130 is compressed in the direction of the force F2, and the first force detection section 130 detects the force F2 as described above. If the force F2 is sufficiently large, after the first force detection section 130 has started to detect the force F2, the cover 120 is further displaced in a direction toward the base 110. The cover 120 contacts the second force detection section 140 as a result, and the second force detection section 140 detects the force F2 acting on the cover 120. The tactile sensor 100 performs output relating to the detected force F2.

As described above, the first force detection section 130 is configured so as to be capable of detecting a relatively small force with a high sensitivity. On the other hand, the second force detection section 140 is capable of detecting a relatively large force. Thus, in cases in which a relatively large force such as the force F2 illustrated in FIG. 6 acts on the cover 120, the force is detected by the second force detection section 140 after the first force detection section 130 has detected the force, thereby enabling the relatively large force to be detected. Examples of operation of the tactile sensor 100 according to the present exemplary embodiment have been explained above.

The tactile sensor 100 according to the present exemplary embodiment includes the second force detection section 140 that detects force acting on the cover 120 in cases in which the cover 120 is further displaced in a direction toward the base 110 after the first force detection section 130 has detected force acting on the cover 120. This enables a relatively small force to be detected with a high sensitivity by the first force detection section 130, and up to a relatively large force to be detected by the second force detection section 140. This enables a small force to be detected with a high sensitivity and the range in which force can be detected to be widened compared to cases in which forces are detected by the same type of force detection section.

Moreover, the robotic hand 13 or the robot 10 including the tactile sensor 100 according to the present exemplary embodiment enables a small force to be detected with a high sensitivity and the range in which force can be detected to be widened, thereby enabling various operations, such a delicate operation requiring a small force and a fitting operation requiring a large force, to be handled. Namely, the robotic hand 13 or the robot 10 according to the present exemplary embodiment can handle various workpieces and operations using such workpieces with versatility. An example of an exemplary embodiment of the tactile sensor 100 according to the present disclosure has been described above.

Modified Example

Next, explanation follows regarding a modified example of the tactile sensor 100 according to the present exemplary embodiment. The present modified example differs to the above exemplary embodiment in the respect that the method by which the first force detection section 130 detects force acting on the cover 120 is a method in which a change in electrical resistance of the elastic member 139 is detected. Other configuration of the present modified example is the same as in the above exemplary embodiment, and so explanation thereof is omitted.

In the present modified example, the elastic member 139 has a predetermined conductivity. For example, the elastic member 139 may be a rubber member containing conductive particles (such as metal particles) dispersed therein. A resistance value of the elastic member 139 changes when the conductive elastic member 139 expands or contracts. This change in the resistance value is detected by measuring electrical resistance between the first electrode 133 and the second electrode 137. Alternatively, rather than providing the first electrode 133 and the second electrode 137, a circuit may be formed by connecting a lead wire to the elastic member 139, and electrical resistance measured as the change in the resistance value of the elastic member 139. Moreover, when detecting the change in the resistance value of the elastic member 139, a configuration may be applied in which two electrodes for measuring the resistance value are provided to either one out of the pair of substrates.

In the present modified example, the elastic member 139 of the first force detection section 130 is conductive, and the change in the resistance value due to expansion or contraction of the elastic member 139 is detected in order to detect force acting on the cover 120. This enables a relatively small force that can be detected using the first force detection section 130 to be precisely detected using a relatively simple configuration. A modified example of the tactile sensor 100 according to the present exemplary embodiment has been explained above.

Second Exemplary Embodiment

Figure 7:
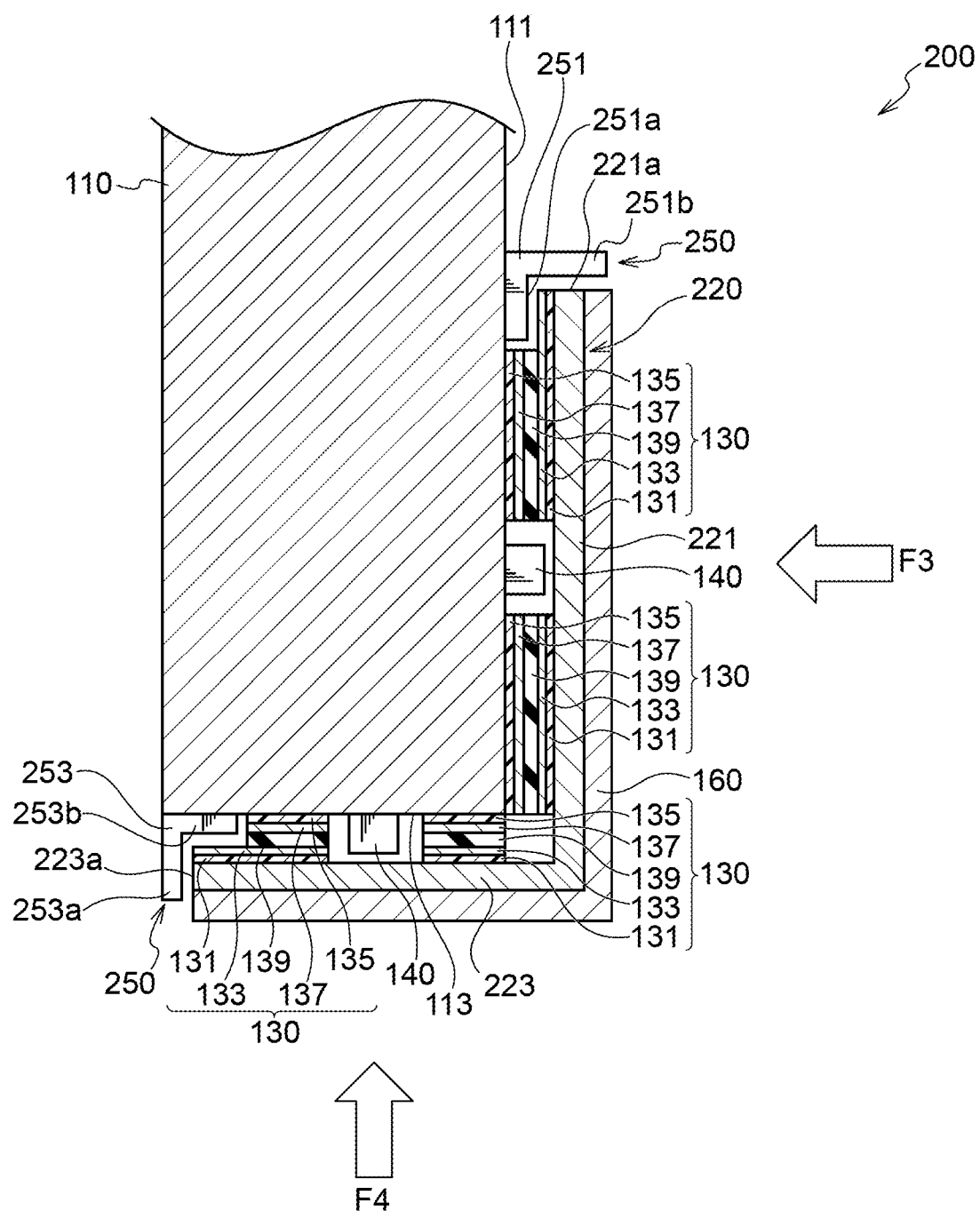
FIG. 7 is a cross-section illustrating an example of a configuration of a tactile sensor according to a second exemplary embodiment of the present disclosure.

Next, explanation follows regarding another example of an exemplary embodiment of the present disclosure, with reference to FIG. 7. A tactile sensor 200 according to the present exemplary embodiment differs to the first exemplary embodiment in the respect that mechanisms for detecting force are provided at plural locations. Note that explanation of common points to the configuration of the first exemplary embodiment is sometimes omitted from the explanation of the present exemplary embodiment.

As illustrated in FIG. 7, the tactile sensor 200 according to the present exemplary embodiment is configured including a base 110, first force detection sections 130, second force detection sections 140, and a cover 220. The cover 220 is a plate shaped member with a substantially L-shaped profile in cross-section view. The cover 220 includes a side face covering portion 221 and an end face covering portion 223.

The side face covering portion 221 is a location disposed along a side face 111 of the base 110 at the inside of the cover 220. The end face covering portion 223 extends out from an end portion of the side face covering portion 221 in a direction extending along the base 110, and is a location disposed along an end face 113 of the base 110.

A first force detection section 130 and a second force detection section 140 are provided between the side face covering portion 221 of the cover 220 and the side face 111 of the base 110. A first force detection section 130 and a second force detection section 140 are also provided between the end face covering portion 223 of the cover 220 and the end face 113 of the base 110.

The tactile sensor 200 according to the present exemplary embodiment also includes stoppers 250. The stoppers 250 includes a side face stopper 251 and an end face stopper 253.

The side face stopper 251 is a member with an L-shaped cross-section profile that is provided to the side face 111 of the base 110. The side face stopper 251 includes a first contact portion 251a configuring one location of the L shape, and a second contact portion 251b configuring another location of the L shape that bends away from the one location.

The first contact portion 251a is a location extending along the side face 111, and the side face stopper 251 is attached to the base 110 through the first contact portion 251a. The first contact portion 251a is capable of abutting a base 110-side face of the side face covering portion 221 of the cover 220. On contacting the side face covering portion 221, the first contact portion 251a restricts the side face covering portion 221 from moving in a direction toward the side face 111 of the base 110.

The second contact portion 251b is a location protruding out along a normal direction to the side face 111 from the first contact portion 251a. The second contact portion 251b is capable of abutting one end face 221a of the side face covering portion 221. On contacting the one end face 221a of the side face covering portion 221, the second contact portion 251b restricts the end face covering portion 223 from moving in a direction toward the end face 113 of the base 110.

The end face stopper 253 is a member with an L-shaped cross-section profile that is provided to the end face 113 of the base 110. The end face stopper 253 includes a third contact portion 253a configuring one location of the L shape, and a fourth contact portion 253b configuring another location of the L shape that bends away from the one location.

The third contact portion 253a is a location protruding out along a normal direction to the end face 113. The third contact portion 253a is capable of abutting another end face 223a of the end face covering portion 223. On contacting the other end face 223a of the end face covering portion 223, the third contact portion 253a restricts the side face covering portion 221 from moving in a direction toward the side face 111 of the base 110.

The fourth contact portion 253b is a location extending along the end face 113 from the third contact portion 253a, and the end face stopper 253 is attached to the base 110 through the fourth contact portion 253b. The fourth contact portion 253b is capable of abutting a base 110-side face of the end face covering portion 223 of the cover 220. On contacting the end face covering portion 223, the fourth contact portion 253b restricts the end face covering portion 223 from moving in a direction toward the end face 113 of the base 110.

Explanation follows regarding operation of the tactile sensor 200 according to the present exemplary embodiment, with reference to FIG. 7. As illustrated in FIG. 7, a force F3 may act on the side face covering portion 221 of the cover 220. When this occurs, the cover 220 is displaced in a direction toward the side face 111 of the base 110. When this occurs, the force F3 is detected by the first force detection section 130 and the second force detection section 140 provided between the side face covering portion 221 and the side face 111 of the base 110. If the force F3 is sufficiently large, the cover 220 is further displaced in a direction toward the base 110. The side face covering portion 221 of the cover 220 abuts the first contact portion 251a of the side face stopper 251 as a result. Furthermore, the other end face 223a of the end face covering portion 223 of the cover 220 abuts the third contact portion 253a of the end face stopper 253. Thus, in cases in which the force F3 is acting on the side face covering portion 221, detection of the force in a state in which the side face covering portion 221 is tilted with respect to the side face 111 of the base 110 is suppressed by the first contact portion 251a of the side face stopper 251 and the third contact portion 253a of the end face stopper 253.

As illustrated in FIG. 7, a force F4 may act on the end face covering portion 223 of the cover 220. When this occurs, the cover 220 is displaced in a direction toward the end face 113 of the base 110. When this occurs, the force F4 is detected by the first force detection section 130 and the second force detection section 140 provided between the end face covering portion 223 and the end face 113 of the base 110. If the force F4 is sufficiently large, the cover 220 is further displaced in a direction toward the base 110. The end face covering portion 223 of the cover 220 abuts the fourth contact portion 253b of the end face stopper 253 as a result. Furthermore, the one end face 221a of the side face covering portion 221 of the cover 220 abuts the second contact portion 251b of the side face stopper 251. Thus, in cases in which the force F4 acts on the end face covering portion 223, detection of the force in a state in which the end face covering portion 223 is tilted with respect to the end face 113 of the base 110 is suppressed by the second contact portion 251b of the side face stopper 251 and the fourth contact portion 253b of the end face stopper 253.

In the tactile sensor 200 according to the present exemplary embodiment, the cover 220 includes the side face covering portion 221 and the end face covering portion 223. This enables not only detection of force directed toward the side face 111 of the base 110 from the side face covering portion 221 of the cover 220, but also detection of force directed toward the end face 113 of the base 110 from the end face covering portion 223 of the cover 220. Furthermore, in the tactile sensor 200 according to the present exemplary embodiment, the base 110 is provided with the side face stopper 251 and the end face stopper 253 that restrict movement of the cover 220 in respective directions toward the side face 111 and the end face 113 of the base 110. Thus, tilting of respective locations of the cover 220 is suppressed, and force acting on the cover 220 is precisely detected by the corresponding first force detection section 130 or second force detection section 140 of the tactile sensor 200. This enables the range in which force can be detected by the tactile sensor 200 to be widened, even in cases in which force is acting on the tactile sensor 200 from plural directions.

Including the tactile sensor 200 in the robot 10 and the robotic hand 13 according to the present exemplary embodiment enables not only detection of force acting on the surfaces S for gripping a workpiece, but also detection of force acting on lower faces of the fingers 13a, 13b. This enables detection of states relating to various operations, not only when a workpiece is being gripped, but also when a workpiece is being inserted using the fingertips. Another example of an exemplary embodiment of the tactile sensor 200 according to the present disclosure has been described above.

Note that although the configuration of the first force detection section 130 has been described as a configuration in which a change in electrostatic capacitance or a resistance value accompanying expansion or contraction of the elastic member 139 is detected in the above exemplary embodiments, the present disclosure is not restricted to this example. For example, a configuration in which a stacked body configured of a piezoelectric material and the elastic member 139 is sandwiched between a pair of electrodes, and a variation in load (change in permittivity) is detected by distortion occurring in the piezoelectric material may be applied as the configuration of the first force detection section 130. Alternatively, a configuration in which magnetic particles are dispersed inside the elastic member 139, and a change in reactance accompanying expansion or contraction of the elastic member 139 is detected may be applied as another configuration of the first force detection section 130. Alternatively, a configuration in which a change in resonance frequency accompanying expansion or contraction of the elastic member 139 is detected may be applied as another configuration of the first force detection section 130.

Although, an example has been described in which the stoppers 151 are provided to the base 110 in the above exemplary embodiments, the stoppers 151 may be provided to the base 110-side face of the cover 120.

Although an example has been described in which the tactile sensors 100 or 200 are provided to the fingers 13a, 13b of the robotic hand 13 in the above exemplary embodiments, a tactile sensor 100 or 200 may be provided to only one out of the fingers 13a, 13b of the robotic hand 13. Alternatively, the tactile sensor 100 or 200 may be provided to a location other than the fingers 13a, 13b of the robotic hand 13. For example, the tactile sensor 100 or 200 may be provided to a wrist portion that is a coupling location between the robotic hand 13 and the other end side of the robotic arm 11b. Alternatively, the tactile sensor 100 or 200 may be provided at any desired position of the robot body 11, including the robotic arm 11b. This enables contact between an operator and the robot 10 to be detected.

Although an example has been described in which the tactile sensor 100 or 200 is applied to a robot 10 serving as an industrial robot in the above exemplary embodiments, application is not limited to an industrial robot. For example, the tactile sensor 100 or 200 may be applied to various service robots, pet robots, or humanoid robots serving as non-industrial robots.

The present disclosure includes the following aspects.

(1) A tactile sensor including a cover provided so as to cover at least a portion of a base, a first force detection section configured to detect a force acting on the cover in a direction toward the base from the cover, and a second force detection section configured to detect force acting on the cover in a case in which the cover is further displaced in the direction toward the base after the first force detection section has detected the force acting on the cover.

(2) The tactile sensor of (1), wherein a maximum value of force that the second force detection section is configured to detect is greater than a maximum value of force that the first force detection section is configured to detect.

(3) The tactile sensor of (1) or (2), wherein the first force detection section is configured by an elastic member provided between a pair of substrates, at least one of the substrates being provided with an electrode. The first force detection section is configured to detect the force acting on the cover by detecting a change in electrostatic capacitance or a change in a resistance value.

(4) The tactile sensor of any one of (1) to (3), wherein the second force detection section comprises a single axis force sensor configured to detect the force in a direction from the cover toward the base.

(5) The tactile sensor of (4), wherein the second force detection section includes plural of the single axis force sensors.

(6) The tactile sensor of any one of (1) to (5), wherein the tactile sensor further includes a restricting structure configured to restrict tilting of the cover with respect to the base.

(7) The tactile sensor of (6), wherein the restricting structure is configured by a stopper configured to restrict movement of the cover in a direction toward the base.

(8) The tactile sensor of (7), wherein the stopper is configured so as to restrict movement of a peripheral edge of the cover.

(9) The tactile sensor of (8), the cover is formed in a rectangular shape, and the stopper is configured to restrict movement of four corners of the cover.

(10) The tactile sensor of any one of (7) to (9), wherein the cover includes a side face covering portion disposed along a side face of the base, and an end face covering portion that extends out from the side face covering portion and is disposed along an end face of the base. The stopper includes a side face stopper provided at the side face of the base and an end face stopper provided at the end face of the base. The side face stopper includes a first contact portion configured to contact the side face covering portion and to restrict movement of the side face covering portion in a direction toward the side face of the base, and a second contact portion configured to contact one end face of the side face covering portion and to restrict movement of the end face covering portion in a direction toward the end face of the base. The end face stopper includes a third contact portion configured to contact the end face covering portion and to restrict movement of the end face covering portion in a direction toward the end face of the base, and a fourth contact portion configured to contact another end face of the end face covering portion and to restrict movement of the side face covering portion in a direction toward the side face of the base.

(11) The tactile sensor of any one of (1) to (10), wherein an exchangeable contact section configured to contact a target location is attached to the cover.

(12) A robotic hand including the tactile sensor of any one of (1) to (11), and an opposing section that is disposed in opposition to the tactile sensor so as to grip a target object between the opposing section and the tactile sensor.

(13) A robot including the robotic hand of (12), and a robot body configured to drive the robotic hand.

EXPLANATION OF REFERENCE NUMERALS 10 robot
11 robot body
13 robotic hand
13a, 13b finger (opposing section)
100, 200 tactile sensor
110 base
111 side face
113 end face
120, 220 cover
130 first force detection section
131 first substrate (substrate)
135 second substrate (substrate)
133 first electrode (electrode)
137 second electrode (electrode)
139 elastic member
140 second force detection section
150 restricting structure
151, 250 stopper
160 contact section
221 side face covering portion
221a one end face
223 end face covering portion
223a another end face
251 side face stopper
251a first contact portion
251b second contact portion
253 end face stopper
253a third contact portion
253b fourth contact portion

The invention claimed is:

1. A tactile sensor, comprising:
a cover provided so as to cover at least a portion of a base, wherein the cover includes:
 a side face covering portion disposed along a side face of the base, and
 an end face covering portion that extends out from the side face covering portion and is disposed along an end face of the base;
a restricting structure configured to restrict tilting of the cover with respect to the base, wherein:
 the restricting structure comprises a stopper configured to restrict movement of the cover in a direction toward the base,
 the stopper includes a side face stopper provided at the side face of the base and an end face stopper provided at the end face of the base,
 the side face stopper, having a first L-shaped cross-section, includes a first contact portion, which is a first leg of the first L-shaped cross-section, configured to contact the side face covering portion and to restrict movement of the side face covering portion in a direction toward the side face of the base, and a second contact portion, which is a second leg of the first L-shaped cross-section, configured to contact one end face of the side face covering portion and to restrict movement of the end face covering portion in a direction toward the end face of the base, and
 the end face stopper, having a second L-shaped cross-section, includes a third contact portion, which is a first leg of the second L-shaped cross-section, configured to contact an end face of the end face covering portion and to restrict movement of the side face covering portion in a direction toward the side face of the base, and a fourth contact portion, which is a second leg of the second L-shaped cross-section, configured to contact the end face covering portion and to restrict movement of the end face covering portion in a direction toward the end face of the base;
a first force detection section configured to detect a force acting on the cover in a direction toward the base from the cover; and
a second force detection section configured to detect the force acting on the cover in a case in which the cover is further displaced in the direction toward the base more than a predetermined distance after the first force detection section has detected the force acting on the cover by coming into contact with the cover, wherein:
 the first force detection section comprises an elastic member provided between a pair of substrates, at least one of the substrates being provided with an electrode,
 the first force detection section is configured to detect the force acting on the cover by detecting a change in electrostatic capacitance or a change in a resistance value,
 the second force detection section comprises a single axis force sensor configured to detect the force in a direction from the cover toward the base, the single axis force sensor has a structure with a higher rigidity than the first force detection section including the elastic member, an output from the second force detection section to the force applied to the cover shows a linear response.

2. The tactile sensor of claim 1, wherein a maximum value of force that the second force detection section is configured to detect is greater than a maximum value of force that the first force detection section is configured to detect.

3. The tactile sensor of claim 1, wherein the second force detection section includes a plurality of the single axis force sensors.

4. The tactile sensor of claim 1, wherein the stopper is configured so as to restrict movement of a peripheral edge of the cover.

5. The tactile sensor of claim 4, wherein:
the cover is formed in a rectangular shape, and
the stopper is configured to restrict movement of four corners of the cover.

6. The tactile sensor of claim 1, wherein an exchangeable contact section configured to contact a target location is attached to the cover.

7. A robotic hand, comprising:
the tactile sensor of claim 1; and
an opposing section that is disposed in opposition to the tactile sensor so as to grip a target object between the opposing section and the tactile sensor.

8. A robot, comprising:
the robotic hand of claim 7; and
a robot body configured to drive the robotic hand.

9. The robotic hand of claim 7, wherein a maximum value of force that the second force detection section is configured to detect is greater than a maximum value of force that the first force detection section is configured to detect.

10. The robotic hand of claim 7, wherein the second force detection section includes a plurality of the single axis force sensors.

11. The robotic hand of claim 7, wherein the stopper is configured to restrict movement of a peripheral edge of the cover.

12. The robotic hand of claim 11, wherein:
the cover is formed in a rectangular shape, and
the stopper is configured to restrict movement of four corners of the cover.

13. The robotic hand of claim 7, wherein an exchangeable contact section configured to contact a target location is attached to the cover.

14. The robot of claim 8, wherein a maximum value of force that the second force detection section is configured to detect is greater than a maximum value of force that the first force detection section is configured to detect.

15. The robot of claim 8, wherein the second force detection section includes a plurality of the single axis force sensors.

16. The robot of claim 8, wherein the stopper is configured to restrict movement of a peripheral edge of the cover.

17. The robot of claim 16, wherein:
the cover is formed in a rectangular shape, and
the stopper is configured to restrict movement of four corners of the cover.

18. The robot of claim 8, wherein an exchangeable contact section configured to contact a target location is attached to the cover.

* * * * *